(12) United States Patent
Kahmann

(10) Patent No.: US 6,443,472 B1
(45) Date of Patent: Sep. 3, 2002

(54) BICYCLE TOWING BRACKET

(75) Inventor: Paul Kahmann, Bloomington, MN (US)

(73) Assignee: InSTEP, LLC, Mendota Heights, MN (US)

( * ) Notice: Subject to any disclaimer, the term of this patent is extended or adjusted under 35 U.S.C. 154(b) by 0 days.

(21) Appl. No.: 09/799,293

(22) Filed: Mar. 5, 2001

(51) Int. Cl.[7] .................................................. B62J 7/04
(52) U.S. Cl. ...................................... 280/204; 280/503
(58) Field of Search ............................... 280/204, 503, 280/495

(56) References Cited

U.S. PATENT DOCUMENTS

| | | | |
|---|---|---|---|
| 3,993,320 A | * 11/1976 | Robinson | 280/204 |
| 4,721,320 A | * 1/1988 | Creps et al. | 280/204 |
| 5,076,599 A | * 12/1991 | Lockett et al. | 280/204 |
| 5,171,034 A | * 12/1992 | Scott | 280/2 |
| 6,056,306 A | 5/2000 | Rust | |

OTHER PUBLICATIONS

Fitting Instructions for Trailer Coupling F2 brochure from H. Hemmelskamp GmbH & Co KG, May 2000.
Fitting Instructions for Trailer Coupling F2 brochure from H. Hemmelskamp GmbH & Co KG, May 2000.

* cited by examiner

*Primary Examiner*—Kevin Hurley
(74) *Attorney, Agent, or Firm*—Gerald E. Helget; Nelson R. Capes; Briggs and Morgan

(57) ABSTRACT

A towing bracket for attachment to the rear frame of a bicycle, to be used for towing a trailer behind the bicycle. The towing bracket has a hanging member that attaches to the hub nut of the rear wheel of the bicycle, and may have a disk with an attached tab that mates with a slot in the rear frame, with the disk having a number of holes that mate with raised nubs in the hanging member, to prevent rotation of the hanging member about the nut. A collar on the hanging member attaches to a trailer linkage, which in turn attaches to a trailer.

6 Claims, 4 Drawing Sheets

BICYCLE TOWING BRACKET

BACKGROUND OF THE INVENTION

The present invention relates to a towing bracket for attaching a trailer to a bicycle, and particularly to a towing bracket attachable to the bolt that attaches the hub of the rear wheel to the bicycle's frame.

U.S. Pat. No. 6,056,306 discloses a bracket for attaching a trailer to a bicycle. As disclosed, the bracket in the '306 patent attaches between the horizontal and inclined frame members of the rear frame of the bicycle by means of a screw knob and a tightening lip.

Applicant has found that one problem with the bracket of the '306 patent is that it is impossible to produce one bracket that will fit all bicycle frames, because bicycle frames vary greatly in the configuration of the inclined I and horizontal H rear frame members. The variation in configuration can be seen in FIGS. 1–4. The spacing between the inclined and horizontal members, the angle between the members, and the thickness of the members all vary to such an extent that it is not feasible to produce a single bracket to accommodate the variations.

There is a need for a bicycle towing bracket which can be atttached to the rear wheel of bicycle without regard to the configuration of the horizontal and inclined members of the rear frame.

SUMMARY OF THE INVENTION

A towing bracket for attaching a trailer to a bicycle, the bicycle having a rear wheel with a hub, a nut and bolt attaching the hub to the bicycle frame, the frame having at least one slot adjacent the bolt, the towing bracket comprising:

a) a hanging member having an aperture therethrough, the aperture adapted to engage the bolt and to be held in place by the nut, the hanging member also having a collar; and b) a trailer linkage having a first end mating with the collar and a second end attachable to a trailer.

A principal object and advantage of the present invention is that it is attached to the hub bolt of the rear wheel, and essentially all bicycles have similar rear wheel hub bolts.

Another principal object and advantage of the present invention is that it may include a locking disk for preventing the bracket from rotating about the rear wheel hub bolt.

DETAILED DESCRIPTION OF THE PREFERRED EMBODIMENT

The rear portion of a bicycle frame F to which the present invention attaches is shown generally in the Figures, and consists of a rear wheel W, hub HB, and a nut N and bolt B that attach the hub HB to the frame F.

In general the frame F has at least one slot S adjacent the bolt B.

Figure 7:
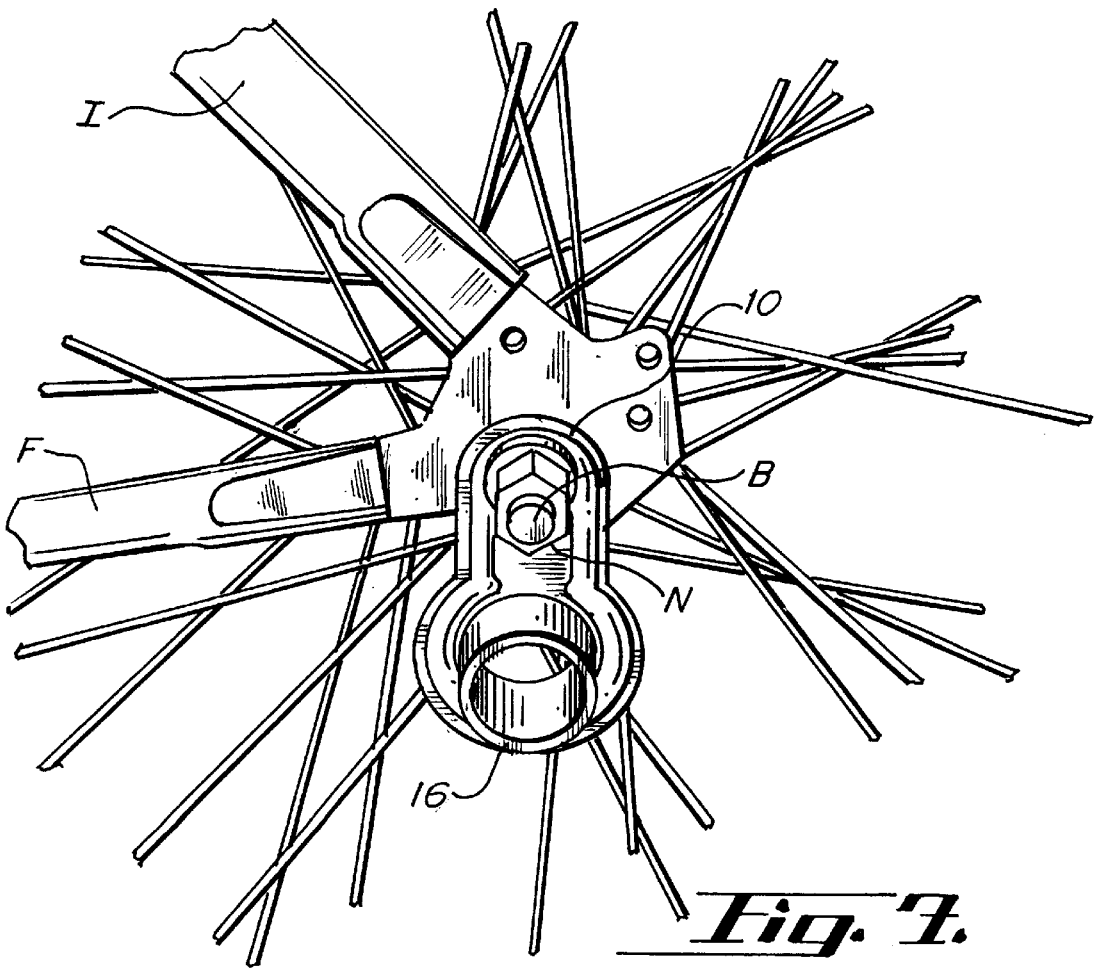
FIG. 7 is an elevational view of the bicycle rear frame portion with the towing bracket attached.

The towing bracket 10 of the present invention comprises a hanging member 12 having an aperture 14 therethrough, the aperture 14 being adapted to engage the bolt B and to be held in place by the nut N, as best seen in FIG. 7.

The hanging member 12 also has a collar 16.

Figure 8:
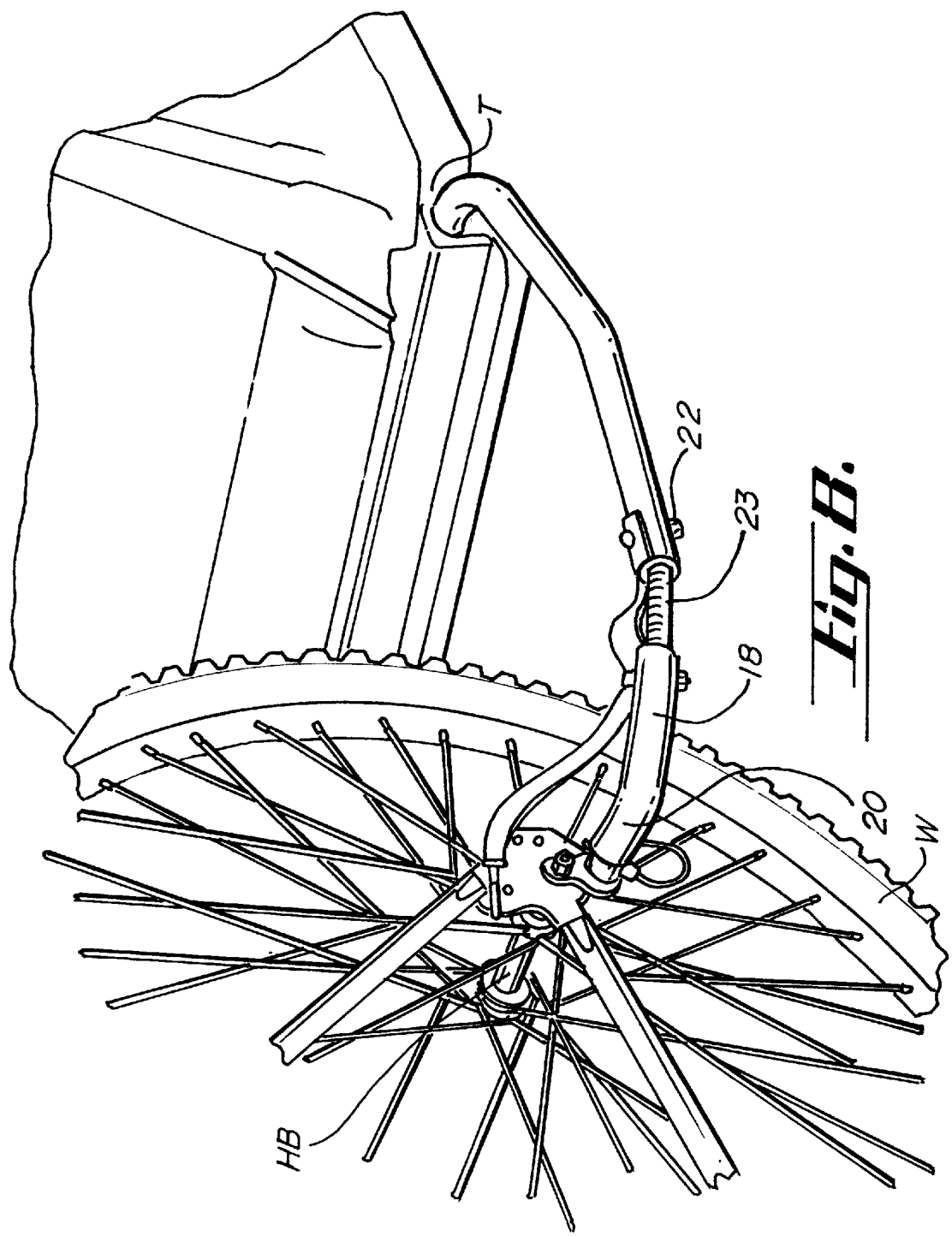
FIG. 8 is a perspective view of the rear wheel of the bicycle with the towing bracket attached and a trailer attached to the towing bracket.

A trailer linkage 18 having a first end 20 and a second end 22 mates with the collar 16, as best seen in FIG. 8. A trailer T is attachable to the second end 22. A spring 23 may be connected between the first end 20 and second end 22, thereby acting as a shock absorber for the trailer T.

In one embodiment, the towing bracket 10 also has a disk 24 having a tab 26 adapted to engage the slot S and a plurality of holes 28. The hanging member 12 has a plurality of raised nubs 30 engaging the plurality of holes 28, whereby the engagement of the tab 26 with the slot S and of the nubs 30 with the holes 28 prevents the hanging member 12 from rotating about the nut N.

Figure 1:
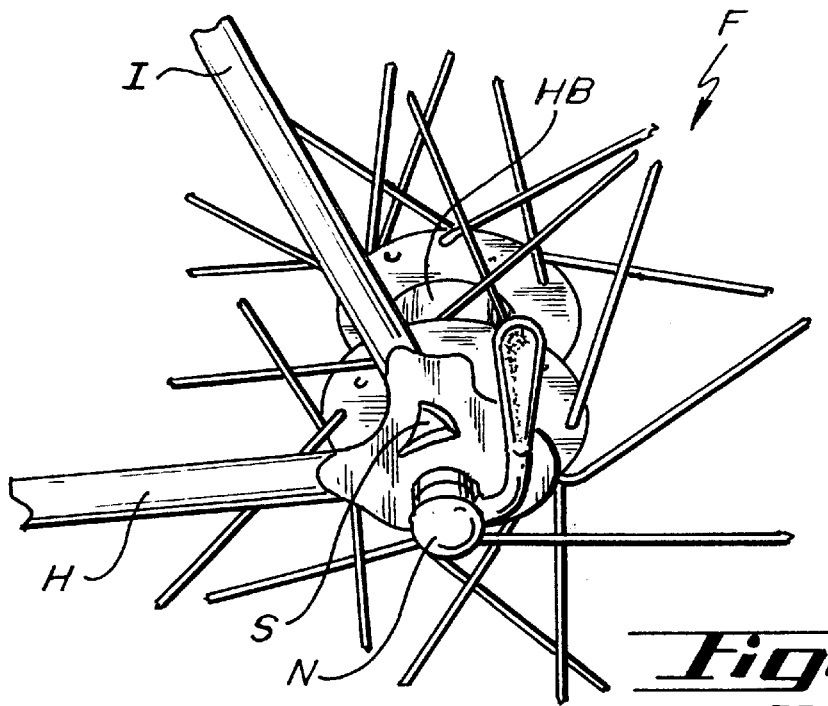
FIGS. 1–4 are elevational views of bicycle rear frame portions of the prior art.
Figure 2:
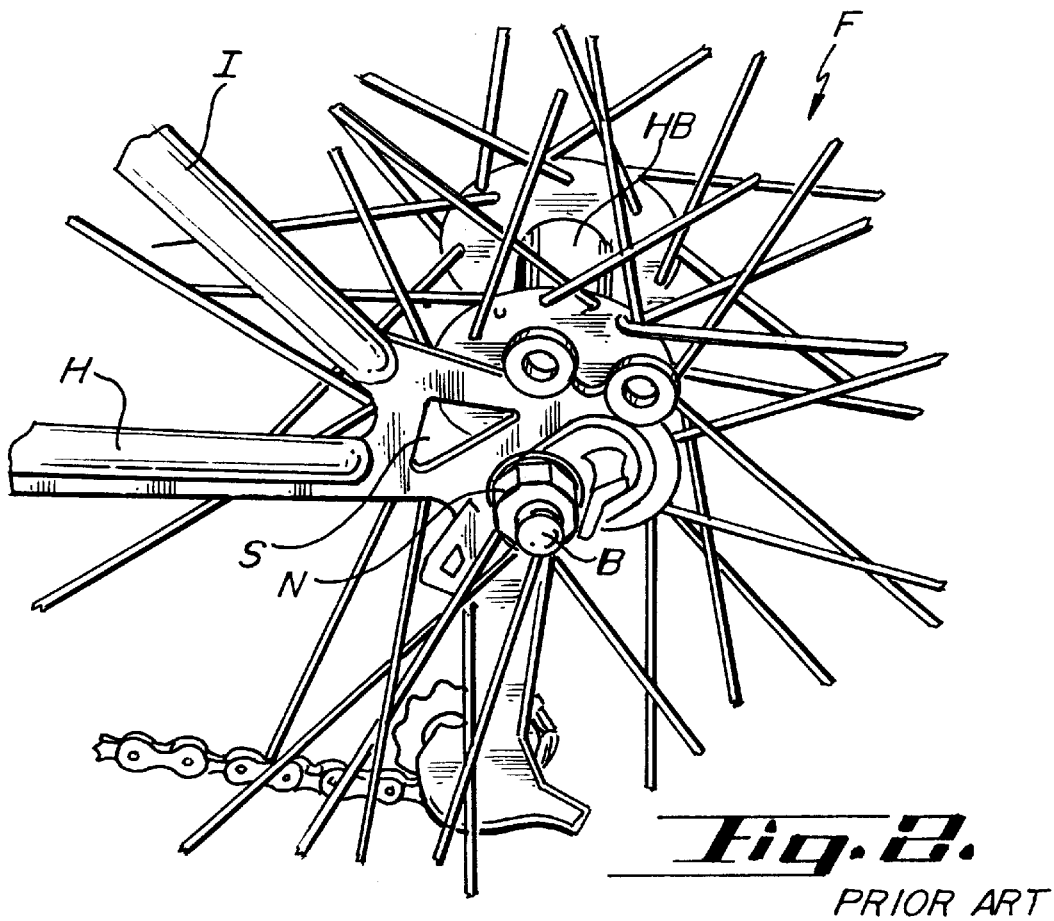
Figure 3:
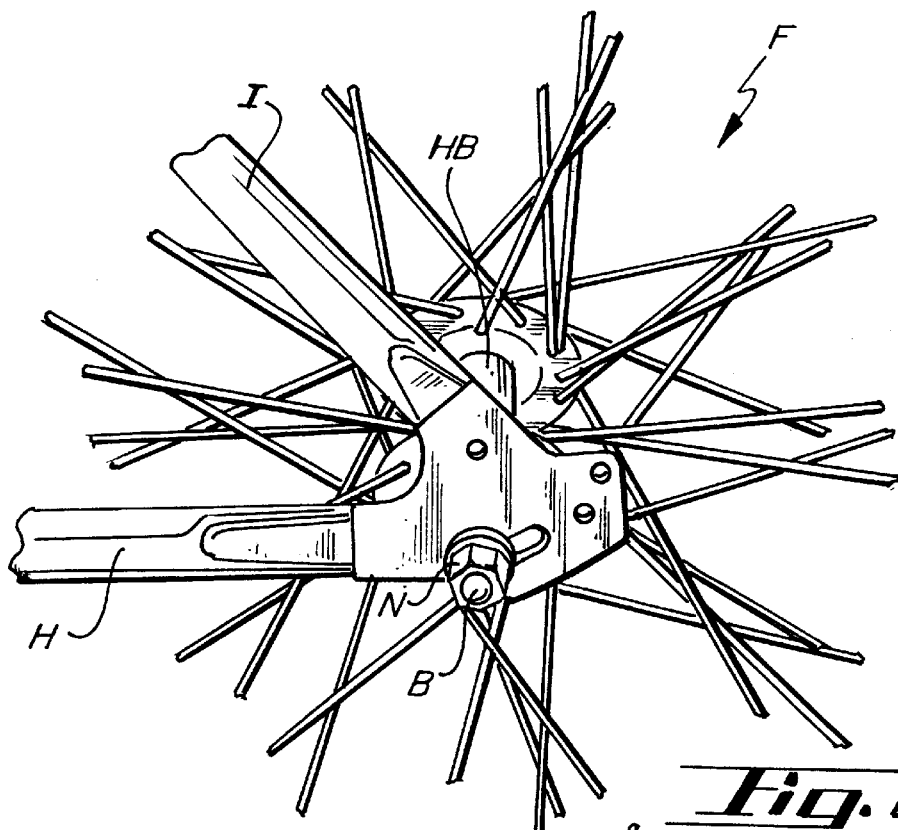
Figure 4:
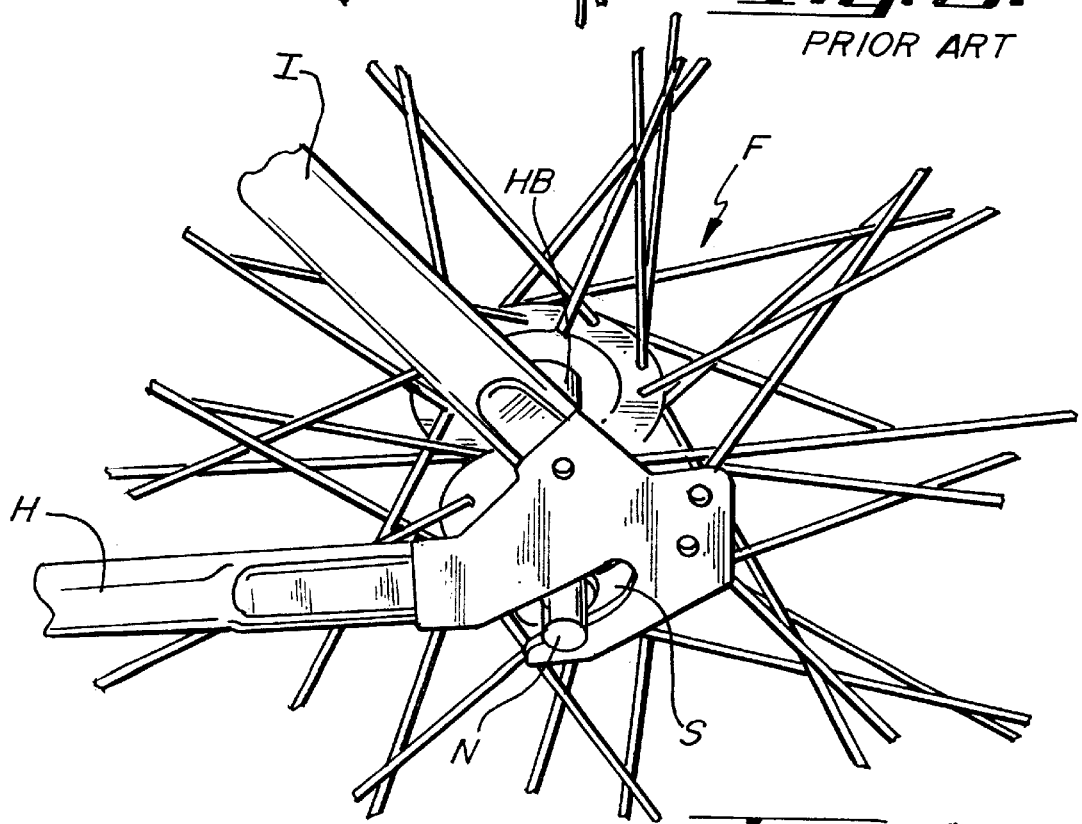
Figure 5:
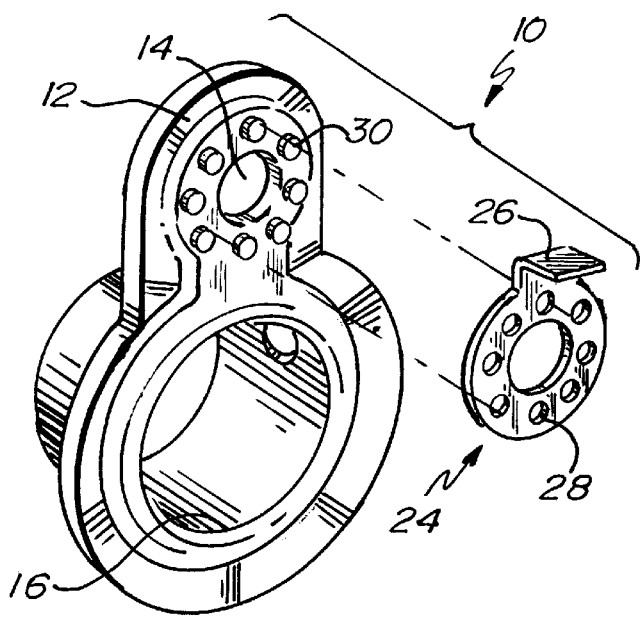
FIG. 5 is an exploded view of the towing bracket of the present invention.
Figure 6:
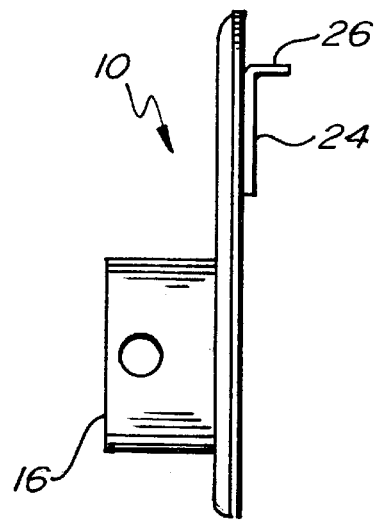
FIG. 6 is an elevational view of the towing bracket of the present invention.

To mount the bracket 10 to the frame F, the nut N is removed from the bolt B, as best seen in FIG. 4. Then the hanging member 12 and, optionally, disk 24, is attached to the bolt B. If the disk 24 is used, the tab 26 is inserted into the slot S. The nut N is then tightened onto the bolt B, holding the hanging member 12 in place. Finally, the trailer linkage 18 is attached to the collar 16, by suitable means such as bolts, screws, cotter pins, etc. The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A towing bracket for attaching a trailer to a bicycle, the bicycle having a rear wheel with a hub, a nut and bolt attaching the hub to the bicycle frame, the frame having at least one slot adjacent the bolt, the towing bracket comprising:

a) a hanging member having an aperture therethrough, the aperture adapted to engage the bolt and to be held in place by the nut, the hanging member is also having a collar projecting at substantially a right angle to the hanging member and to the rear wheel;

b) a trailer linkage having a first tubular end mating with the collar and a second end attachable to a trailer.

2. The bracket of claim 1, further comprising a disk having a tab adapted to engage the slot and a plurality of holes; and the hanging member having a plurality of raised nubs thereabout, the raised nubs engaging the plurality of holes in the disk, whereby the engagement of the tab with the slot and of the nubs with the holes prevents the hanging member from rotating about the nut.

3. The bracket of claim 1, wherein the trailer linkage further comprises a spring connected between the first end and the second end and acting as a shock absorber for the trailer.

4. The bracket of claim 1, wherein the trailer linkage further comprises a spring connected between the first end and the second end and acting as a shock absorber for the trailer.

5. A towing bracket for attaching a trailer to a bicycle, the bicycle having a rear wheel with a hub, a nut and bolt attaching the hub to the bicycle frame, the frame having at least one slot adjacent the bolt, the towing bracket comprising:

a) a disk having a tab adapted to engage the slot and a plurality of holes;

b) a hanging member having an aperture therethrough, the aperture adapted to engage the bolt and to be held in place by the nut, the aperture having a plurality of raised nubs thereabout, the raised nubs engaging the plurality of holes in the disk, whereby the engagement of the tab with the slot and of the hubs with the holes prevents the hanging member from rotating about the nut, the hanging member also having a collar projecting at substantially a right angle to the hanging member and to the rear wheel; and c) a trailer linkage having a first tubular end mating with the collar and a second end attachable to a trailer.

6. A towing bracket for attaching a trailer to a bicycle, the bicycle having a rear wheel with a hub, a nut and bolt attaching the hub to the bicycle frame, the frame having at least one slot adjacent the bolt, the towing bracket comprising:

a) a disk having a tab adapted to engage the slot and a plurality of holes;

b) a hanging member having an aperture therethrough, the aperture adapted to engage the bolt and to be held in place by the nut, the aperture having a plurality of raised nubs thereabout, the raised nubs engaging the plurality of holes in the disk, whereby the engagement of the tab with the slot and of the hubs with the holes prevents the hanging member from rotating about the nut, the hanging member also having a collar projecting at substantially a right angle to the hanging member and to the rear wheel: and c) a trailer linkage having a first tubular end mating with the collar and a second end attachable to a trailer, wherein the trailer linkage further comprises a spring connected between the first and the second end and acting as a shock absorber for the trailer.

* * * * *